United States Patent Office 3,637,627
Patented Jan. 25, 1972

3,637,627
OLEFIN POLYMERS AND METHOD FOR PRODUCING SAME
James N. Short, Robert P. Zelinski, Rudolf H. Gaeth, and Ernest A. Zuech, Bartlesville, Okla., assignors to Phillips Petroleum Company
No Drawing. Filed May 3, 1967, Ser. No. 635,708
Int. Cl. C08f 1/56, 15/04
U.S. Cl. 260—88.2                                18 Claims

ABSTRACT OF THE DISCLOSURE

Acyclic olefinic monomers containing 3 to about 20 carbon atoms per molecule are converted into ethylene-propylene copolymers by contact with a catalyst system comprising a coordination complex of a transition metal or a transition metal inorganic compound associated with a difficultly reducible metal oxide or phosphate; a Group IV–B or V–B metal compound; and an organoaluminum dihalide or organoaluminum sesquihalide.

---

This invention relates to a method for converting acyclic monoolefins to copolymers and to a catalyst for such method. In one aspect the invention relates to a method for converting an olefin containing at least 3 carbon atoms per molecule into an ethylene-propylene rubber. In another aspect it relates to a catalyst system for such conversion.

We have found that ethylene-propylene copolymers can be formed by contacting an olefin such as propylene, or a mixture of acyclic olefins having 3 to about 20 carbon atoms per molecule, with a three component catalyst system formed by admixture of (a) a coordination complex of a transition metal or a transition metal compound associated with a difficultly reducible metal oxide or phosphate with (b) a Group IV–B or V–B metal compound and (c) an organoaluminum dihalide or organo-aluminum sesquihalide. We have found that use of the three component catalyst system of the invention results in formation of liquid, rubbery or resinous copolymers which are believed to result from polymerization of propylene initially present in the feed or that formed during the conversion of a mixed feed, as well as from incorporation of other olefins present or formed during the conversion, into the growing copolymer chain. The addition of a diolefin containing at least 6 carbon atoms per molecule to the reaction system results in formation of a sulfur-vulcanizable copolymer.

It is an object of the present invention to provide a method for converting an acyclic monoolefin having at least 3 carbon atoms per molecule into an ethylene-propylene rubber. It is also an object of this invention to provide a catalyst system for converting propylene into an ethylene-propylene copolymer. Another object of this invention is to provide a catalyst system comprising a transition metal coordination complex as a transition metal inorganic compound associated with a difficultly reducible metal oxide or phosphate; a Group IV–B or V–B metal compound; and an organoaluminum dihalide or organoaluminum sesquihalide. Other aspects, objects and advantages of the invention will be apparent to one skilled in the art upon study of the disclosure including the detailed description of the invention.

The transition metal-containing component (a) of the catalyst system of the present invention can be represented by the formula $[(L)_a(L')_bM_cZ_d]_x$ wherein (L) and (L') are organic or inorganic ligands; M is a transition metal of Group I–B, III–B, IV–B, V–B, VI–B, or VII–B or the iron and cobalt subgroups of Group VIII; Z is halide or a radical such as CN, SCN, OCN, and $SnCl_3$; $a$ and $d$ are numbers 0–6, $b$ is 0–2, $c$ is 1–4; $x$ is a number indicative of the polymeric state of the compound; and wherein the number of (L), (L') and Z groups present in the component (a) compound shall not be greater than the number required for the metal to achieve the closed shell electronic configuration of the next higher atomic number inert gas; preferred (L) groups are $R_3Q$, $R_3QO$, $R_2Q$—$QR_2$, $R_2NR'$, O, CO, NO, $R_2N$—$R_2$—$NR_2$, R—S—R, $R^3S$, $[\pi$—$(CHR^4\text{—}CR^4\text{—}CH_2)\text{—}]$, $R^5(CN)_k$, $R^5(COO)_k$, $RCOR^6(COO)_k$, $[(RCO)_2CH]$, $(R_2NCSS)$, unsubstituted and $R^5$ group-substituted pyridine, unsubstituted and $R^5$ group-substituted bipyridine, or unsubstituted and R group-substituted cyclopentadienyl radicals; (L') ligands are NO or $$[\pi\text{—}(CHR^4\text{—}CR^4\text{—}CH_2)\text{—}]$$

wherein R is an aromatic or saturated aliphatic radical, including radicals substituted with groups such as halo groups or alkoxy groups and the like, having up to 20 carbon atoms; R' is hydrogen or an R radical; $R^2$ is a divalent R radical; $R^3$ is a divalent saturated aliphatic or ethylenically unsaturated aliphatic radical having from 4 to 10 carbon atoms; $R^4$ is hydrogen or methyl radical; $R^5$ is an aromatic, saturated aliphatic, or ethylenically unsaturated aliphatic radical having up to 30 carbon atoms; $R^6$ is a divalent saturated aliphatic radical having from 1 to 10 carbon atoms; Q is phosphorus, arsenic, or antimony; and $k$ is 1–2; or a transition metal inorganic compound associated with a difficultly reducible metal oxide or phosphate such as:

(1) Silica or thoria promoted by an oxide or compound convertible to an oxide by calcination or sulfide of tungsten or molybdenum or by an oxide or compound convertible to an oxide by calcination of rhenium or tellurium;

(2) Alumina promoted with an oxide or compound convertible to an oxide by calcination of molybdenum, tungsten, or rhenium; a sulfide of tungsten or molybdenum; or an alkali metal salt, ammonium salt, alkaline earth metal salt, or bismuth salt of phosphomolybdic acid;

(3) One or more of the group aluminum phosphate, zirconium phosphate, calcium phosphate, magnesium phosphate, or titanium phosphate promoted by one or more of a sulfide of molybdenum or tungsten, or an oxide or compound convertible to an oxide by calcination of molybdenum, tungsten, or rhenium or magnesium tungstate or beryllium phosphotungstate; and (4) Silica, alumina, aluminum phosphate, zirconium phosphate, calcium phosphate, magnesium phosphate, or titanium phosphate promoted by a hexacarbonyl of molybdenum or tungsten.

The preferred component (a) compounds are complex compounds of the metals of Groups VI–B, VII–B, and the iron and cobalt subgroups of Group VIII. The more preferred metals of these are molybdenum, tungsten, rhenium, ruthenium, or rhodium with the most preferred metal complex being a complex of molybdenum, such as NO-treated molybdenum trichloride distearate.

In many instances the suitable (a) component need not be an isolated complex compound but can, for convenience and economy, simply be the admixture of a suitable, relatively simple, compound of a transition metal and one or more complexing agents. Thus, under complex-forming conditions, the admixture of these ingredients, complete with the complex forming diluent which is generally used to facilitate the mixing, can frequently be utilized without additional separation, isolation, or other treatment. For example, a suitable (a) component can be the admixture obtained by bubbling NO through a cyclohexane solution of molybdenum trichloride distearate.

The transition metal compounds which are applicable for use as the (a) component of the catalyst system of the present invention are generally compounds which are available or which can be prepared by methods which are conventional in the art.

When it is desired to prepare and utilize transition metal complex compounds in the form of non-isolated admixtures of its components, a transition metal compound and one or more complexing agents are merely combined in proportions and under conditions of temperature and time which permit the catalytically active transition metal complex to be formed, generally in a diluent in which the components are at least partly soluble. Suitable transition metal starting compounds, for example, are halides, oxyhalides, carbonyls, carbonyl halides, or salts of inorganic acids, preferably halides.

Some specific examples of suitable transition metal complex (a) components are:

(triphenylphosphine)$_2$(NO)$_2$MoCl$_2$
(NO)$_2$MoCl$_2$
(pyridine)$_2$(NO)$_2$MoCl$_2$
NO-treated (triphenylphosphine)$_2$MoCl$_4$
NO-treated (pyridine)$_2$MoCl$_4$
NO-treated (butyronitrile)$_2$MoCl$_4$
NO-treated (stearate)$_2$MoCl$_3$
NO-treated pyridine-treated MoCl$_5$
NO-treated (benzoate)$_2$MoCl$_3$
NO-treated (acetylacetonate)$_2$MoO$_2$
NO-treated MoOCl$_3$
NO-treated tetrallyltin-treated MoCl$_5$
NO-treated MoCl$_5$
NOCl-treated pyridine-treated MoO$_2$
NO-treated tributylphosphine-treated MoCl$_5$
NO-treated thiophene-treated MoCl$_5$
NO-treated pyridine-treated WCl$_6$
NO-treated benzoic acid-treated WCl$_6$
(triphenylphosphine)$_2$(NO)$_2$WCl$_2$
(triphenylphosphine)$_2$ReOCl$_3$
(triphenylphosphine)$_2$ReCl$_4$
(triphenylphosphine)$_2$ReOBr$_3$
(acetylacetonate)$_4$Re$_2$Cl$_4$
(triphenylphosphine)ReOBr$_3$
CO-treated triphenylphosphine-treated RuCl$_3$
NO-treated RuCl$_3$
NO-treated CO-treated RuCl$_3$
(triphenylphosphine)$_4$(CO)$_2$Ru$_2$(SnCl$_3$)Cl$_3$
NO-treated triphenylphosphine-treated RuCl$_3$
NOCl-treated (triphenylphosphine)$_3$RhCl
NO-treated (triphenylphosphine)$_3$RhCl
($\pi$-allyl)$_2$RhCl
NO-treated triphenylphosphine-treated RhCl$_3$
(triphenylphosphine)$_3$Cu$_2$Cl$_2$
(triphenylphosphine)AuCl
[(triphenylphosphine)AgBr]$_x$
(triphenylphosphine)$_2$Cr(CO)$_4$
(triphenylphosphine)$_2$MoCl$_4$
SmCl$_3$
ThCl$_4$
UCl$_3$
UCl$_4$
(cyclopentadienyl)TiCl$_3$
pyridine-treated TiCl$_4$
(acetylacetonate)$_4$Zr
NO-treated benzoic acid-treated NbCl$_5$
NO-treated (triphenylphosphine)$_2$CoCl$_2$
NO-treated-triphenylphosphine-treated IrCl$_3$ and
NO-treated CO-treated triphenylphosphine-treated IrCl$_3$
and the like, and mixtures thereof.

The elements referred to herein are in accordance with the Periodic Table of Elements appearing in Handbook of Chemistry and Physics, Chemical Rubber Company, 45th edition (1964).

The formula $[(L)_a(L')_bM_cZ_d]_x$ is used herein to identify the product obtained by the admixture, under catalyst forming conditions, of the metal compound with one or more ligand-forming materials whether or not the components are present in the complex as indicated in the formula.

When the (a) component of the catalyst system is the product obtained by combining a compound of a transition metal, as hereinbefore discussed, with one or more suitable ligand-forming materials, these materials are simply combined under conditions of time and temperature which permit the complex to be formed. In general, excessively high temperatures at which the reagents tend to decompose, or excessively low temperatures, at which the reagents tend to crystallize or otherwise tend to become unreactive, should be avoided. The molar proportion of transition metal salt to the selected ligand-former can be in the range of from about 0.1:1 to about 10:1, preferably from about 0.2:1 to about 2:1. The products are obtained by combining these ingredients at a temperature preferably in the range of from about 0 to about 130° C., more preferably 20 to about 60° C., for a time in the range of from a few seconds up to about 24 hours, preferably in the presence of a diluent in which the components of the admixture are at least partially soluble. Any convenient diluent such as carbon tetrachloride, methylene chloride, xylene, cyclohexane, isooctane, benzene, chlorobenzene, and the like, can be used for this purpose. Any order of addition can be used. Such product need not be isolated but the mixture can be used directly in the formation of the catalyst system. In general, the (a) component of the catalyst system is fully prepared before contact is made with the (c) component or adjuvant and the (b) component.

When the (a) component is a transition metal inorganic compound associated with a difficultly reducible metal oxide or phosphate, it can be prepared as follows:

The catalysts of (1) can be prepared and activated by conventional techniques such as by combining a catalyst grade silica with suitable tungsten, molybdenum, rhenium, or tellurium, compounds by a conventional method such as, for example, impregnation, dry mixing, or coprecipitation. Suitable tungsten and molybdenum compounds include tungsten oxide and molybdenum oxide and compounds convertible to these oxides. The supported oxides are activated by calcining in air and the supported sulfides are activated by heating in an inert atmosphere.

The catalysts of (2) can be prepared and activated by conventional techniques such as by combining catalyst grade alumina with an oxide or a compound convertible to an oxide by calcination of molybdenum, tungsten or rhenium and calcining the resulting mixture after removal of any solvent used in the impregnation. The sulfides of tungsten or molybdenum or the salts of phosphomolybdic acid can be utilized to impregnate a catalyst grade alumina by solution in a proper solvent after which the solvent is evaporated and the resulting mixture dried to prepare the catalyst.

The catalyst compositions of (3) can be prepared and activated by conventional techniques. For example, molybdenum oxide can be coprecipitated with aluminum phosphate followed by calcination in air to produce an activated catalyst. Alternatively, the support material can be impregnated with a compound of the promoter convertible to the oxide, such as ammonium tungstate, followed by calcination in air. In the preparation of a sulfide-containing catalyst, a sulfide of the promoter can be ball-milled with a support, such as zirconium phosphate, followed by heating in an inert atmosphere such as nitrogen. Magnesium tungstate and beryllium phosphotungstate can be dry mixed with titanium phosphate, for example, and activated by calcination in the air at elevated temperatures.

The catalyst compositions of (4) can be prepared and activated by impregnating a previously calcined support material such as calcium phosphate with a solution of the hexacarbonyl of the promoter in an organic solvent such as benzene, followed by drying in a vacuum or in an inert atmosphere at about 50 to 700° F.

The Group IV–B or V–B used as the (b) component of the system is usually a vanadium, niobium, or titanium compound, and is preferably a vanadium compound selected from the vanadium halides, such as vanadium trifluoride, vanadium dibromide, and vanadium tetrachloride; the vanadium oxyhalides, such as vanadium oxydibromide, vanadium oxytribromide, vanadium oxytrifluoride, vanadium oxydichloride, and vanadium oxytrichloride; and the vanadium compounds having the formula $VOY_{3-m}X_m$ where Y is an alkoxy group, a cycloalkoxy group, an aryloxy group, or an acetylacetonate group, X is a halogen, and $m$ is 0 to 2 when Y is other than acetylacetonate and 0 when Y is acetylacetonate. Thus, the vanadium compound can be a trihydrocarbyl ester of orthovanadic acid, a dihydrocarbyl ester of halo-orthovanadic acid, or a hydrocarbyl ester of dihalo-orthovanadic acid, which esters have the general formula $$VO(OR)_{3-m}X_m$$

where R is as previously described, X is halogen, and $m$ is 0 to 2, or the vanadium compound can be a vanadyl triacetylacetonate having the formula $VOA_3$ where A is the acetylacetonate group or a haloacetylacetonate group, or other beta-diketone group. Exemplary of such vanadium compounds are triethyl orthovanadate, trieicosyl orthovanadate, tricyclohexyl orthovanadate, diphenyl chloro orthovanadate, benzyl dibromo orthovanadate, vanadyl acetylacetonate, vanadyl trifluoroacetylacetonate, vanadyl tri(hexachloroacetylacetonate), and the like. The corresponding titanium and niobium compounds can be used, and mixtures of these compounds can be used.

The (c) component is an aluminum-containing compound, (1) represented by the formula $RAlX_2$; or a mixture of (1) and a compound (2) represented by the formula $R_nAlX_m$ wherein R is as previously described; X is halogen; $n$ is 2 or 3; $m$ is 0 or 1; and the sum of $n$ and $m$ is 3.

Some specific examples of $RAlX_2$ compounds are: methylaluminum dichloride, ethylaluminum dichloride, n-butylaluminum dichloride, n-heptylaluminum dibromide, cyclohexylaluminum dibromide, 4-methylcyclohexylaluminum difluoride, n-eicosylaluminum difluoride, isopropylaluminum diiodide, benzylaluminum dichloride, 2,4,6 - trimethylphenylaluminum dichloride, n-decylaluminum dichloride and 2-naphthylaluminum dichloride.

Some specific examples of $R_nAlX_m$ compounds are: trimethylaluminum, triethylaluminum, tri-n-propylaluminum, triisobutylaluminum, tri-n-hexylaluminum, tri-n-octylaluminum, tricyclohexylaluminum, triphenylaluminum, tri-n-decylaluminum, tris-n-eicosylaluminum, methyldiphenylaluminum, tribenzylaluminum, tri-1-naphthylaluminum, di-n-octylphenylaluminum, tri - 4 - tolylaluminum, di-methylaluminum chloride, di-n-propylaluminum bromide, diethylaluminum chloride, diisobutylaluminum chloride, methylisobutylaluminum chloride, n-heptylaluminum fluoride, diphenylaluminum bromide, dibenzylaluminum chloride and di-n-octylaluminum iodide.

The molar proportion of the (c) component to the (a) and (b) components, to form the catalyst system of the present invention, will generally be in the range of from about 0.1:1 to 20:1, preferably from about 1:1 to about 10:1. The organoaluminum sesquihalide or dihalide component of the catalyst primarily controls Mooney viscosity of the product so long as there is a sufficient amount of the sesquihalide present to support polymerization. In the absence of the sesquihalide or dihalide there is no polymerization. Increasing the ratio of the dihalide or sesquihalide (c) to (a)+(b) lowers viscosity with some loss of yield but does not change substantially the ethylene to propylene ratio of the product. Changing the ratio of the Group IV–B or V–B metal component or of the transition metal component does not have a very great effect on the ethylene to propylene ratio of the product.

Reaction temperature has a striking effect on the ethylene-propylene ratio of the product with increasing amounts of ethylene in the product as temperature increases. For example, at 68° F., the ethylene to propylene ratio is 26/74; at 86° F., it is 38/62 and at 104° F., it is 46/54. Thus, temperature provides a convenient means for controlling the ethylene to propylene ratio.

The catalyst is prepared simply by combining the (a) component and the (b) and (c) components under conditions of time and temperature which permit the catalytically active mixture to be formed, avoiding excessively high temperatures at which some of the reagents tend to decompose or excessively low temperatures at which some of the reagents tend to crystallize or otherwise tend to become inactive. This combination occurs very readily and, in general, the components can be mixed at any convenient temperature preferably within the range of —80 to about 100° C. for a few seconds or for several hours in the presence of a diluent in which both the components are at least partially soluble. Any convenient diluent such as benzene, cyclohexane, toluene, chlorobenzene, methylene chloride, ethylene chloride, and the like, can be used for this purpose. Halogenated diluents are generally preferred. The mixing of the catalyst components is carried out in the substantial absence of air or moisture, generally in an inert atmosphere. After the catalytic reaction mixture is formed, it need not be isolated but can be added directly to the olefin reaction zone as a dispersion in its preparation solvent. If desired, the catalyst components can be separately added, in any order, to the reaction zone either in the presence or absence of the feed olefin.

Olefins which are applicable for use in the present invention include those represented by the formula $R-CH=CH_2$ and $R-CH=CH-CH_3$ wherein R is as previously described. Examples of $R-CH=CH_2$ olefins include propylene; 1-butene; 1-pentene; 1-hexene; 1-octene; 1-dodecene; 1-hexadecene; 1-eicosene; and the like. Examples of $R-CH=CH-CH_3$ olefins include 2-butene; 2-pentene; 2-hexene; 2-heptene; 2-octene; 2-tridecene; and 2-heptadecene. Examples of polyenes that can be added to the reaction mixture to introduce unsaturation into the polymer include 1,4-hexadiene; 1,9-octadecadiene; 4-vinyl-1-cyclohexene; dicyclopentadiene; 2-methylnorbornadiene; 2,6 - dimethyl - 2,4,6 - octatriene (alloocimene); 2-methyl-1,5 - hexadiene; 2 - methyl-6-methylene-2,7 - octadiene (myrcene); 6,6 - dimethyl-2-vinyl - 2 - norpinene (nopadiene); 2,4,6 - octatriene; 5-methylene-2 - norbornene; materials such as butadiene trimer (a commercial product obtained from U.S. Industrial Chemicals Company); and the like.

According to the process of the invention, the olefins or mixture of olefins to be converted is contacted with the catalyst system at any convenient temperature, avoiding excessively high temperatures at which some of the reagents tend to decompose, or excessively low temperatures at which some of the reagents tend to crystallize or otherwise tend to become inactive. The process will often be carried out at a temperature preferably within the range of from about —30 to about 150° C., more preferably from 0 to about 75° C., at any convenient pressure which is sufficient to maintain a liquid phase. The conversion can be carried out in the presence of any diluent such as that used for the catalyst preparation, if desired. Diluents are not essential but are generally preferred and such diluents can include saturated aliphatics and aromatics such as cyclohexane, xylene, isooctane, and the like, and halogenated derivatives thereof. The time of contact will depend upon the desired degree of conversion and the catalysts and olefins utilized, but will, generally, be in the range of from about 0.1 minute to 24 hours, preferably 5–120 minutes. The proportion of catalyst composition to olefin feed in the reaction zone will generally be in the range of from about 0.001–100 millimoles of the Group I–B metal for each mole of olefin in the reaction zone.

Any conventional contacting technique can be used for the olefin conversion, and batchwise or continuous operation can be utilized. After the reaction period, the products can be separated and/or isolated by conventional means such as by fractionation, crystallization, adsorption, and the like. Unconverted feed material or products not in the desired molecular weight range can be recycled to the conversion zone. If desired, the catalyst can be deactivated by treatment with a sufficient amount of water or alcohol prior to the separation of the products. Otherwise, after separation of the products, the catalyst can be recycled to the reaction zone. Separation of products can be accomplished by distillation, crystallization, evaporation, and the like.

In Examples I–IV, the transition metal compound used was di(triphenylphosphine) molybdenum dinitrosyl dichloride, which was prepared as described in Inorganic Chemistry 3, No. 11, pages 1609–1612 (1964). Briefly, $Mo(CO)_6$ was dissolved in chlorobenzene, nitrosyl chloride was bubbled through to precipitate $Mo(NO)_2Cl_2$, which was dissolved in benzene and heated with two equivalents of triphenylphosphine. The reaction product was recovered by evaporating the benzene. The aluminum sesquihalide used was methylaluminum sesquichloride. The Group IV–B or V–B compound used was vanadium oxytrichloride. The charge order was (1) reaction medium, (2) molybdenum compound, (3) olefin(s), (4) vanadium compound, and (5) aluminum compound. A 10- to 15-minute nitrogen purge followed step (2), but is not essential.

EXAMPLE I

The recipe used was:

Cyclohexane—50 ml.
Mo compound—0.53 mmol
Al compound [1]—1.2 mmols
V compound—1.1 mmols
1-butene—0.375 g.
2-butene—0.375 g.

[1] Added after 30 minutes reaction time.

The reaction was carried out at 122° F. After 30 minutes reaction without the aluminum compound present, gas liquid chromatography (GLC) analysis of the vapor phase showed only 1-butene and 2-butene. The aluminum compound was then added, and reaction was continued for 30 minutes. GLC analysis of the vapor phase at this time showed a small ethylene peak, a large propylene peak, a very small 2-butene peak, and a large 1-butene peak. The product obtained by filtration and evaporation of the reaction medium was a liquid polymer containing no unsaturation. Infrared analysis of the polymer showed —CH, —$CH_2$ and —$CH_3$ groups.

EXAMPLE II

The recipe used was:

Cyclohexane—100 ml.
Mo compound—0.4 mmol
Al compound—5 mmols
V compound—2.5 mmols
1-butene [1]
2-butene [1]

[1] 1-butene and 2-butene were added in about equal amounts to give a total pressure of 19 p.s.i.g. in the 355-ml. reactor.

After 2 hours reaction time at 86° F., the insoluble precipitate formed was filtered off, the solvent was evaporated, and the liquid polymer obtained was analyzed by nuclear magnetic resonance (NMR). The spectrum was essentially the same as that for ethylene-propylene rubber of commerce, and showed no ethyl bands. About 45 percent of the protons were associated with —$CH_3$ groups and the remaining protons were associated with —CH and —$CH_2$ groups. The polymer was essentially saturated, and infrared analysis indicated the possibility of some short —$CH_2$ sequences.

EXAMPLE III

The recipe used was:

Cyclohexane—100 ml.
Mo compound—0.27 mmol
Al compound—2.5 mmols
V compound—1.5 mmols
Propylene—13.6 g.

After 1.5 hours reaction time at 86° F., 6 grams of a rubbery polymer was recovered by isopropyl alcohol coagulation. This polymer was essentially saturated and infrared analysis showed that it contained methyl groups corresponding to a polymer containing 67 weight percent combined propylene and 33 weight percent other olefins (mainly ethylene). This run was duplicated with essentially the same results.

EXAMPLE IV

The recipe used was:

Cyclohexane—1500 ml.
Mo compound—1.3 mmols
Al compound—19 mmols
V compound—8.1 mmols
Propylene—155 g.

The stirred reactor was heated to 86° F. over a 15-minute period, and was kept at that temperature for 105 minutes. Reactor pressure was initially about 40 p.s.i.g. but decreased to about 16 p.s.i.g. during reaction The rubbery product obtained by isopropyl alcohol coagulation had a Mooney viscosity (ASTM D 1641-63, ML–4 at 212° F.) of 22.8 Infrared analysis of the polymer showed methyl groups corresponding to 74 percent propylene.

EXAMPLE V

Different polyenes were employed to introduce unsaturation into the polymeric product prepared from propylene. In these runs the transition metal component was the reaction product of nitric oxide with molybdenum trichloride distearate. The organoaluminum component was methylaluminum sesquichloride or ethylaluminum sesquichloride. The vanadium component was vanadium oxytrichloride. The molybdenum trichloride distearate was prepared by reacting stearic acid with molybdenum pentachloride in cyclohexane. The recipe was as follows:

Cyclohexane, ml. _____ 500
Stearic acid, grams (0.35 mole) _____ 100
Molybdenum pentachloride, grams (0.18 mole) ___ 50

The materials were charged to the reactor which was then purged with nitrogen for 10 minutes. The temperature was adjusted to 122° F. and maintained at this level for 15 hours. The reactor was then vented and purged with nitrogen for 15 minutes. The molybdenum trichloride distearate was soluble in cyclohexane. The calculated molarity of the solution was 0.36. A vessel containing the molybdenum trichloride distearate was pressured to 30 p.s.i.g. with NO for approximately one hour at room temperature (about 75° F.) to obtain the reaction product used for the transition metal component in the catalyst system.

Two different recipes were employed for the polymerization. They were as follows:

|  | A | B |
|---|---|---|
| Propylene, parts by weight | 100 | 100 |
| Cyclohexane, parts by weight | 800 | 800 |
| Polyene, mhm | Variable | Variable |
| Methylaluminum sesquichloride, mhm | 5 | |
| Ethylaluminum sesquichloride, mhm | | 20 |
| Vanadium oxytrichloride, mhm | 2 | 8 |
| Molybdenum trichloride distearate plus NO mhm | [1] 0.5 | [1] 1 |
| Temperature, °F | 77–86 | 86 |
| Time, hours | 2 | 2 |

[1] Based on molybdenum.

NOTES.—Mhm., gram millimoles per 100 grams monomer.

When conducting a polymerization, cyclohexane was charged to the reactor first after which it was purged with nitrogen. Propylene was then introduced followed by the molybdenum component, the vanadium oxytrichloride, and finally the organoaluminum compound.

At the conclusion of each polymerization, the reaction was shortstopped with a 10 weight percent solution of 2,2′-methylene-bis(4-methyl-6-tert-butyl-phenol) in a mixture of equal parts by volume of isopropyl alcohol and toluene, the amount used being sufficient to provide approximately one part by weight of the antioxidant per 100 parts by weight of polymer. The polymer was coagulated in isopropyl alcohol, separated and dried. Data are presented in Table I.

TABLE I

| Run | Recipe | Polyene Type | Mhm. | Polymer, phm.[1] | Inherent viscosity | Toluene insolubles, wt. percent | Unsat'n. mmoles ICl/g., polymer |
|---|---|---|---|---|---|---|---|
| 1 | B | Alloocimene | 50 | 18 | 0.52 | 0 | 0.22 |
| 2 | B | Butadiene trimer | 10 | 17 | 0.76 | 0 | 0.12 |
| 3 | A | Dicyclopentadiene | 10 | 18 | 2.83 | 23 | 0.12 |
| 4 | A | 2-methyl-1,5-hexadiene | 50 | 19 | 1.59 | 0 | 0.16 |
| 5 | B | Myrcene | 10 | 14 | 0.44 | 0 | 0.12 |
| 6 | A | 5-methylene-2-norbornene | 25 | 11 | 1.64 | 21 | 0.42 |
| 7 | B | Nopadiene | 25 | 22 | 0.93 | 0 | 0.09 |
| 8 | A | 2,4,6-octatriene | 10 | 12 | 1.66 | 0 | 0.16 |

[1] Weight of polymer obtained per 100 parts by weight propylene charged.
[2] Millimoles of iodine chloride per gram of polymer (procedure described in U.S. Patent No. 3,299,016).

These data show that all polymers contained unsaturation.

TABLE II

| Run | Catalyst Al-V-Mo, mhm. | Polymer, phm. | Inherent viscosity | Toluene insolubles, wt. percent | Combined propylene in the polymer |
|---|---|---|---|---|---|
| 9 | 5-2-0.25 | 22 | 2.4 | 0 | 81 |
| 10 | 5-2-0.5 | 32 | 2.78 | 0 | 78 |
| 11 | 5-2-1 | 40 | 3.78 | 0 | 68 |
| 12 | 5-0.5-1 | 11 | 4.70 | 0 | 45 |
| 13 | 5-1-1 | 26 | 4.29 | 0 | 60 |
| 14 | 5-3-1 | 18 | 3.49 | 0 | 95 |
| 15 | 10-2-1 | 28 | 1.90 | 0 | 64 |
| 16 | 10-3-1 | 46 | 2.41 | 0 | 72 |
| 17 | 10-4-1 | 53 | 2.57 | 0 | 75 |
| 18 | 10-5-1 | 54 | 2.60 | 0 | 90 |
| 19 | 10-4-0.5 | 46 | 2.18 | 0 | 77 |
| 20 | 10-4-2 | 47 | 3.04 | 0 | 80 |
| 21 | 15-4-1 | 46 | 1.69 | 0 | 76 |
| 22 | 20-4-1 | 46 | 1.35 | 0 | 81 |
| 23 | 20-8-1 | 65 | 1.46 | 0 | 84 |
| 24 | 20-8-2 | 70 | 1.68 | 0 | 81 |
| 25 | 20-8-4 | 64 | 2.13 | 0 | 68 |
| 26 | 20-1-4 | 18 | 2.41 | 0 | 51 |
| 27 | 20-2-4 | 27 | 2.34 | 0 | 53 |

These data show that the inherent viscosity and also the propylene content of the polymer can be varied by changing the mole ratios of catalyst components and also the catalyst level.

EXAMPLE VII

Different organoaluminum compounds were employed in conjunction with VOCl$_3$ and (MoCl$_3$St$_2$+NO) as catalyst components for the polymerization of propylene. In each run, 100 parts by weight of propylene and 800 parts by weight of cyclohexane were charged. The temperature was 86° F. and the reaction period was one hour. The amounts of Al—V—Mo catalyst components, expressed as mhm. were varied. Data are presented in Table III.

TABLE III

| Run | Organo Al Cpd. | Al-V-Mo mhm. | Polymer, phm. | Inherent viscosity | Toluene insolubles, wt. percent | Combined propylene in the polymer |
|---|---|---|---|---|---|---|
| 28 | Et$_3$Al$_2$Cl$_3$ | 10-4-1 | 53 | 2.57 | 0 | 75 |
| 29 | EtAlCl$_2$ | 10-4-1 | 22 | 0.91 | 32 | 92 |
| 30 | Et$_3$Al$_2$Cl$_3$ | 20-4-1 | 46 | 1.35 | 0 | 81 |
| 31 | Me$_3$Al$_2$Cl$_3$ | 5-2-1 | 34 | 3.27 | 0 | 78 |
| 32 | Me$_3$Al$_2$Cl$_3$ | 10-2-1 | 25 | 1.94 | 0 | 65 |

NOTE.—Et=ethyl; Me=methyl.

EXAMPLE VI

Runs were made to demonstrate the effect of different catalyst levels and different mole ratios on the polymerization of propylene in the presence of ethylaluminum sesquichloride (EASC), VOCl$_3$, and the reaction product of molybdenum trichloride distearate and nitric oxide (MoCl$_3$St$_2$+NO) as the catalyst. In each run, 100 parts by weight of propylene and 800 parts by weight of cyclohexane were charged. The reaction product of

was prepared as described in Example V. The temperature was 86° F. and the reaction period was one hour. Data are presented in Table II.

These data show that the type of organoaluminum compound employed has an effect on the propylene content of the polymer. The mole ratio of catalyst components also has an effect on the propylene content of the product as well as on the inherent viscosity.

EXAMPLE VIII

Propylene was polymerized in the presence of a catalyst comprising methylaluminum sesquichloride, vanadium oxytrichloride, and activated cobalt molybdate on alumina. The cobalt molybdate was activated by heating it in air at 900–1100° F. for 5 hours. It was then cooled under nitrogen. The activated product contained from 2–4 weight percent cobalt oxide and 8 weight percent molybdenum. The polymerization recipe was as follows:

| | |
|---|---|
| Propylene, parts by weight | 100 |
| Cyclohexane, parts by weight | 1200 |
| Activated cobalt molybdate on alumina, parts by weight | 2.3 |
| Vanadium oxytrichloride, mhm. | 10.2 |
| Methylaluminum sesquichloride, mhm. | 22.6 |
| Temperature, °F. | 81 |
| Time, hour | 1 |

Cyclohexane was charged to the reactor after which it was purged with nitrogen. The activated cobalt molybdate on alumina was added, followed by the propylene, $VOCl_3$, and finally with the methylaluminum sesquichloride. Results were as follows:

| | |
|---|---|
| Polymer, phm. | 60 |
| Inherent viscosity | 0.20 |
| Toluene insolubles, wt. percent | 22 |
| Propylene, wt. percent | 68 |

In the foregoing examples, the procedure used to determine total unsaturation by iodine chlorine titration was as follows: A 0.5-gram sample of polymer was dissolved in a 75/25 volume mixture of carbon disulfide and chloroform, a chloroform solution of iodine chloride of known concentration (approximately 0.09-0.10 molar) was added, the mixture was placed in a 25° C. bath for one hour to allow time for reaction, and the excess of iodine chloride was titrated with 0.05 N sodium thiosulfate. The millimoles of iodine chloride that reacted with one gram of sample was then calculated. A blank was run using only solvent and iodine chloride and appropriate correction was made when calculating unsaturation.

In the examples, an infrared procedure was used to determine the weight percent propylene. A carbon tetrachloride solution of the polymer containing one gram of polymer per 100 milliliters solvent was used. The solution was placed in a 1500-micron cell and scanned for a peak at the 7.25 micron band using a commercial infrared spectrophotometer. The number of methyl groups (N) was obtained from the formula:

$$N = \frac{(14{,}000)(A_{7.25})(1{,}000)}{(C)(t)(\epsilon)} \quad (I)$$

14,000=molecular weight of 1,000 methylene groups
$A_{7.25}$=absorbance at the 7.25 micron band
C=concentration of polymer solution in gram/liter
$t$=cell thickness in centimeters
$\epsilon$=specific extinction coefficient The specific extinction coefficient ($\epsilon$=28,700) was determined using three samples of an ethylene/propylene copolymer of known propylene content as a reference material. The value was obtained by solving the equation $$\epsilon = \frac{(14{,}000)(A_{7.25})}{(d)(t)(N)} \quad (II)$$

$d$=density of polymer solution in gm./cc. (assumed to be 0.9)
$t$=thickness of absorbing layer of polymer in centimeters
N=number of methyl branches in control polymer.

The weight percent propylene was calculated as follows:

$$\text{Weight percent} = \frac{(N)(100)}{333} \quad (III)$$

In the Formula III, 333 is the number of methyl branches per 1,000 methylene groups.

The inherent viscosities referred to in the examples were determined by placing one-tenth gram of polymer in a wire cage made from 80 mesh screen and placing the wire cage in 100 ml. of toluene contained in a widemouth, 4-ounce bottle. After standing at room temperature (approxmiately 25° C.) for 24 hours, the cage was removed and the solution was filtered through a sulfur absorption tube of grade C porosity to remove any solid particles present. The resulting solution was run through a Medalia-type viscometer supported in a 25° C. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

The amount of toluene insolubles referred to in the examples is that amount of material not dissolved after 0.2 gram sample of the polymer remains in contact with 100 milliliters of toluene at room temperature for 24 hours. The value should be below 50 weight percent for a rubbery polymer. Ordinarily, it is preferred to have the value below 25 weight percent, but for some uses (mechanical goods, mats, shoe soles, etc.), it can be higher. For uses where high resilience and low heat buildup are important, it is desirable to have the toluene insolubles low.

That which is claimed is:

1. A process for converting at least one acyclic olefin having 3 to about 20 carbon atoms per molecule into an ethylene-propylene copolymer which comprises contacting the olefin with a three component catalyst consisting essentially of a first component (a),
   (A) an NO treated complex which forms on admixture of a molybdenum, tungsten, rhenium, ruthenium or rhodium compound in the form of its halides, oxyhalides, carbonyls, carbonyl halides, or salt of an organic acid with a complexing agent having the formula $R_3Q$ or $R^5(COO)_k$, and with NO or nitrosyl halide wherein Q is phosphorus, arsenic or antimony, R is an aromatic or saturated aliphatic radical having up to 20 carbon atoms including radicals substituted with halo or alkoxy groups, $R^5$ is an aromatic, saturated aliphatic or ethylenically unsaturated radical having up to 30 carbon atoms and $k$ is 1 or 2; or
   (B) an activated transition metal inorganic compound associated with a difficulty reducible metal oxide or phosphate which is
      (1) silica or thoria promoted by an oxide or compound convertible to an oxide by calcination or sulfide of tungsten or molybdenum, or by an oxide or compound convertible to an oxide by calcination of rhenium or tellurium;
      (2) alumina promoted with an oxide or compound convertible of an oxide by calcination of molybdenum, tungsten, or rhenium; a sulfide of tungsten or molybdenum; or an alkali metal salt, ammonium salt, alkaline earth metal salt, or bismuth salt of phosphomolybdic acid;
      (3) one or more of the group aluminum phosphate, zirconium phosphate, calcium phosphate, magnesium phosphate, or titanium phosphate promoted by one or more of a sulfide of molybdenum or tungsten, or an oxide or compound convertible to an oxide by calcination of molybdenum, tugnsten, or rhenium or magnesium tungstate or beryllium phosphotungstate; or
      (4) silica, alumina, aluminum phosphate, zirconium phosphate, calcium phosphate, magnesium phosphate, or titanium phosphate promoted by a hexacarbonyl of molybdenum or tungsten;

a second component (b), a vanadium halide, vanadium oxyhalide, or vanadium compound represented by the formula $$VOY_{3-m}X_m$$

where Y is alkoxy, cycloalkoxy, aryloxy, or acetylacetonate, X is halogen, $m$ is 0 to 2 when Y is other than acetylacetonate and O when Y is acetylacetonate; and a third component (c), an organoaluminum compound which is
(1) a compound represented by the formula $RAlX_2$, or
(2) a mixture of (1) and a compound represented by the formula $$R_nAlX_m$$

wherein R is an aromatic or saturated aliphatic radical, including radicals substituted with halo groups or alkoxy groups, having up to 20 carbon atoms; X is halogen, $n$ is 2 or 3; $m$ is 0 or 1; the sum of $n$ and $m$ is 3; wherein the molar proportion of the (c) component to the (a) and (b) components is in the range of from 0.1:1 to 20:1, and said conversion is accomplished at a temperature of from about $-30$ to about $150°$ C. at a pressure which is sufficient to maintain the liquid phase.

2. The process of claim 1 wherein the (A) component of the catalyst is represented by the formula $$[(L)_a(L')_bM_cZ_d]_x$$

wherein M is molybdenum, tungsten, rhenium, ruthenium, or rhodium, Z is a halide, L is a ligand represented by the formula $R_3Q$ or $R^5(COO)_k$, L' is NO, $a$ is 1, 2, or 4, $b$ is 2, $c$ is 1 or 2, and $d$ is 1–4 or 6, and $x$ is the number of the polymeric state of the complex; the number of L, L', and Z groups present is not greater than the number required for the metal to achieve the closed shell electronic configuration of the next highest atomic number inert gas, and wherein R is an aromatic or saturated aliphatic radical having up to 20 carbon atoms, including radicals substituted with halo groups or alkoxy groups, $R^5$ is aromatic, saturated aliphatic, or ethylenically unsaturated aliphatic radical having up to 30 carbon atoms, and $k$ is 1–2.

3. The process of claim 1 wherein the acyclic olefin is propylene.

4. The process of claim 1 wherein the acyclic olefin is a mixture of 1-butene and 2-butene.

5. The process of claim 1 wherein the proportion of catalyst composition to olefin feed in the reaction zone is in the range of from about 0.001–100 millimoles of aluminum metal for each mole of olefin feed.

6. The process of claim 1 wherein the first component (a) is said complex (A).

7. The process of claim 6 wherein
(a) is NO-treated molybdenum trichloride distearate;
(b) is vanadium oxytrichloride; and
(c) is ethylaluminum sesquichloride.

8. The process of claim 6 wherein the (a) component is di(triphenylphosphine) molybdenum dinitrosyl dichloride, the (b) component is vanadium oxytrichloride, and the (c) component is methylaluminum sesquichloride.

9. The process of claim 6 wherein the (a) component is the reaction product of nitric oxide with molybdenum trichloride distearate, the (b) component is vanadium oxytrichloride and the (c) component is ethylaluminum dichloride, methylaluminum sesquichloride, or ethylaluminum sesquichloride.

10. The process of claim 1 wherein the first component (a) is said transition metal inorganic compound associated with a difficultly reducible metal oxide or phosphate (B).

11. The process of claim 10 wherein the (a) component is activated cobalt molybdate on alumina, the (b) component is vanadium oxytrichloride, and the (c) component is methylaluminum sesquichloride.

12. A catalyst consisting essentially of a first component (a),
(A) an NO treated complex which forms on admixture of a molybdenum, tungsten, rhenium, ruthenium or rhodium compound in the form of its halides, oxyhalides, carbonyls, carbonyl halides, or salt of an organic acid with a complexing agent having the formula $R_3Q$ or $R^5(COO)_k$, and with NO or nitrosyl halide wherein Q is phosphorus, arsenic or antimony,
R is aromatic or saturated aliphatic radical having up to 20 carbon atoms including radicals substituted with halo or alkoxy groups, $R^5$ is an aromatic, saturated aliphatic or ethylenically unsaturated radical having up to 30 carbon atoms and $k$ is 1 or 2; or
(B) an activated transition metal inorganic compound associated with a difficultly reducible metal oxide or phosphate which is
(1) silica or thoria promoted by an oxide or compound convertible to an oxide by calcination or sulfide of tungsten or molybdenum or by an oxide or compound convertible to an oxide by calcination of rhenium or tellurium;
(2) alumina promoted with an oxide or compound convertible to an oxide by calcination of molybdenum, tungsten, or rhenium; a sulfide of tungsten or molybdenum; or an alkali metal salt, ammonium salt, alkaline earth metal salt, or bismuth salt of phosphomolybdic acid;
(3) one or more of the group aluminum phosphate, zirconium phosphate, calcium phosphate, magnesium phosphate, or titanium phosphate promoted by one or more of a sulfide of molybdenum or tungsten, or an oxide or compound convertible to an oxide by calcination of molybdenum, tungsten, or rhenium or magnesium tungstate or beryllium phosphotungstate; or
(4) silica, alumina, aluminum phosphate, zirconium phosphate, calcium phosphate, magnesium phosphate, or titanium phosphate promoted by a hexacarbonyl of molybdenum or tungsten;
a second component (b), a vanadium halide, vanadium oxyhalide, or vanadium compound represented by the formula $$VOY_{3-m}X_m$$

wherein Y is alkoxy, cycloalkoxy, aryloxy, or acetylacetonate, X is halogen, $m$ is 0 to 2 when Y is other than acetylacetonate and O when Y is acetylacetonate; and a third component (c), an organoaluminum compound which is (1) a compound represented by the formula $RAlX_2$, or
(2) a mixture of (1) and a compound represented by the formula $$R_nAlX_m$$

wherein R is an aromatic or saturated aliphatic radical, including radicals substituted with halo groups or alkoxy groups, having up to 20 carbon atoms; X is halogen; $n$ is 2 or 3; $m$ is 0 or 1; and the sum of $n$ and $m$ is 3; wherein the molar proportion of the (c) component to the (a) and (b) components is in the range of from 0.1:1 to 20:1.

13. The catalyst of claim 12 wherein the (A) component of the catalyst is represented by the formula $$[(L)_a(L')_bM_cZ_d]_x$$

wherein M is molybdenum, tungsten, rhenium, ruthenium, or rhodium, Z is a halide, L is a ligand represented by the formula $R_3Q$ or $R^5(COO)_k$, L' is NO, $a$ is 1, 2, or 4, $b$ is 2, $c$ is 1 or 2, and $d$ is 1–4 or 6, and the number of L, L', and Z groups present are not greater than the number required for the metal to achieve the closed shell electronic configuration of the next highest atomic number inert gas, and wherein R is an aromatic or saturated aliphatic radical having up to 20 carbon atoms, including radicals substituted with halo groups or alkoxy groups, $R_5$ is aromatic, saturated aliphatic or ethylenically unsaturated aliphatic radical having up to 30 carbon atoms, and $k$ is 1–2.

14. The catalyst of claim 12 wherein the first component (a) is said complex (A).

15. The catalyst of claim 14 wherein the (a) component is di(triphenylphosphine) molybdenum dinitrosyl dichloride, the (b) component is vanadium oxytrichloride, and the (c) component is methylaluminum sesquichloride.

16. The catalyst of claim 14 wherein the (a) component is the reaction product of nitric oxide with molybdenum trichloride distearate, the (b) component is vanadium oxytrichloride and the (c) component is ethylaluminum dichloride, methylaluminum sesquichloride, or ethylaluminum sesquichloride.

17. The catalyst of claim 12 wherein the first component (a) is said transition metal inorganic compound associated with a difficultly reducible metal oxide or phosphate (B).

18. The catalyst of claim 17 wherein the (a) component is activated cobalt molybdate on alumina, the (b) component is vanadium oxytrichloride, and the (c) component is methylaluminum sesquichloride.

References Cited

UNITED STATES PATENTS

| | | | |
|---|---|---|---|
| 3,479,329 | 11/1969 | Chauvin et al. | 260—88.2 |
| 3,476,730 | 11/1969 | Streck et al. | 260—93.7 |
| 2,898,326 | 8/1959 | Peters et al. | 260—88.1 |
| 2,980,664 | 4/1961 | Stuart | 260—93.7 |
| 3,033,844 | 5/1962 | Peters et al. | 260—93.7 |
| 3,105,066 | 9/1963 | MacKenzie | 260—93.7 |
| 3,170,906 | 2/1965 | Ueda et al. | 260—94.3 |
| 3,325,463 | 6/1967 | Iwamoto et al. | 260—93.7 |
| 3,398,130 | 8/1968 | Boor | 260—93.7 |
| 3,462,399 | 8/1969 | Matthews | 260—80.78 |
| 3,463,827 | 8/1969 | Banks | 260—666 |
| 3,336,277 | 8/1967 | Iwamoto et al. | 260—80.78 |

FOREIGN PATENTS

| | | |
|---|---|---|
| 1,027,758 | 4/1966 | Great Britain. |
| 1,415,239 | 9/1965 | France. |

JOSEPH L. SCHOFER, Primary Examiner

E. J. SMITH, Assistant Examiner

U.S. Cl. X.R.

252—429 C, 431, 431 C, 431 N, 431 P; 260—93.7, 94.9 C, 94.9 E, 683.15